Jan. 5, 1965 H. KARLBY ETAL 3,164,017
FLOW MEASURING APPARATUS
Filed Nov. 7, 1957 4 Sheets-Sheet 1
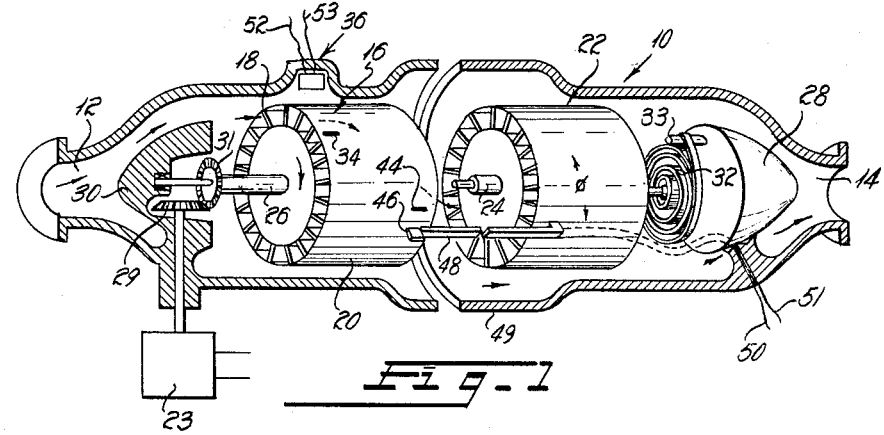
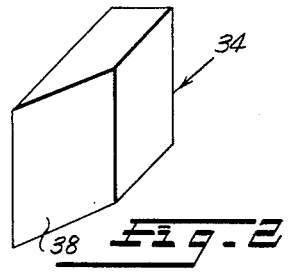
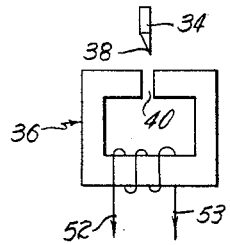
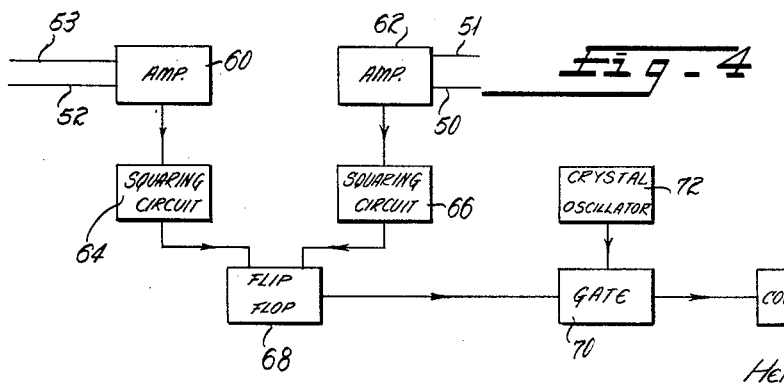
INVENTORS
HENNING KARLBY
WILLIAM P. CAYWOOD, Jr.
H. EARNEST LEATHA
BY Strauch, Nolan & Neale
ATTORNEYS

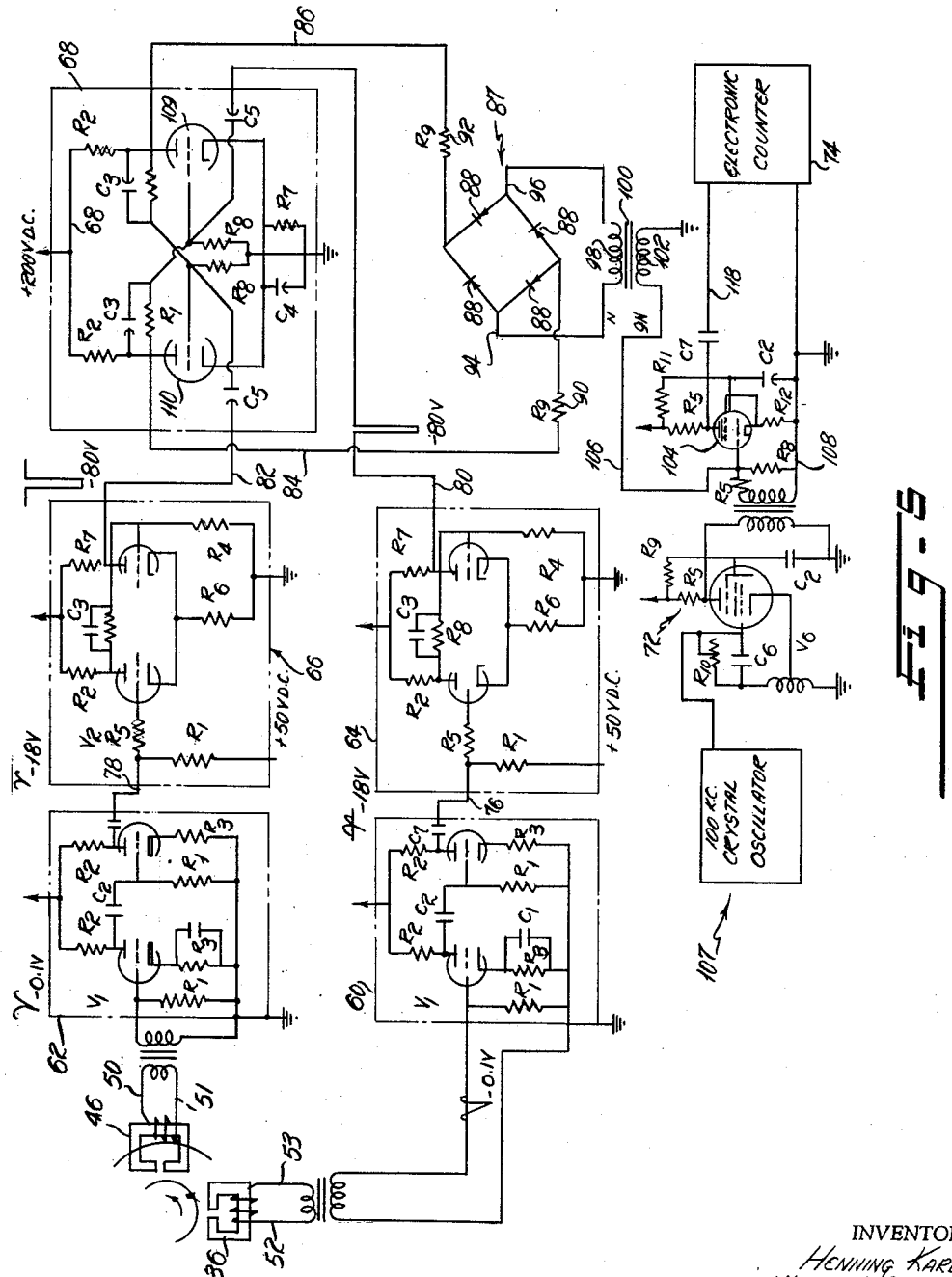

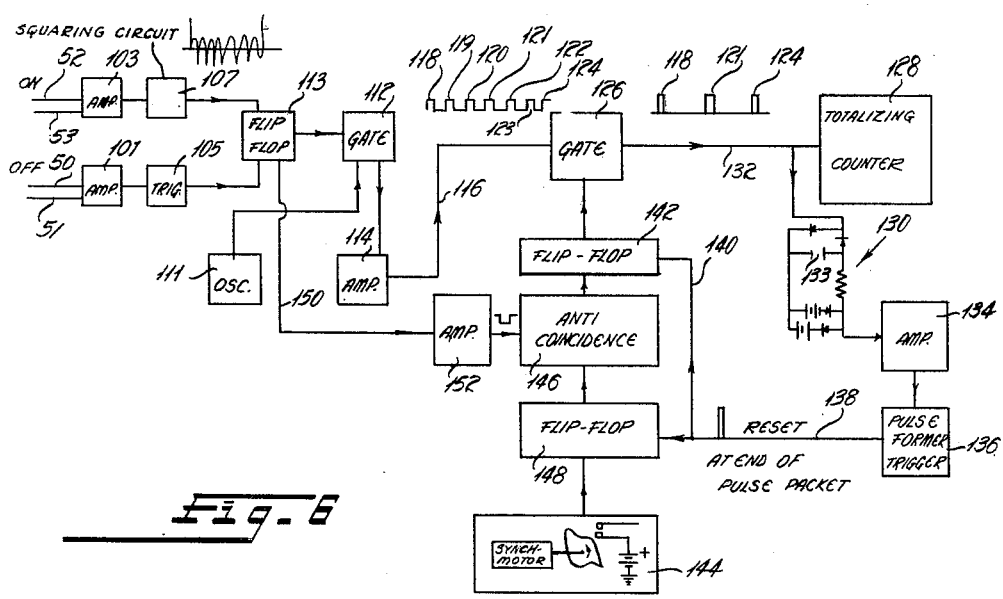
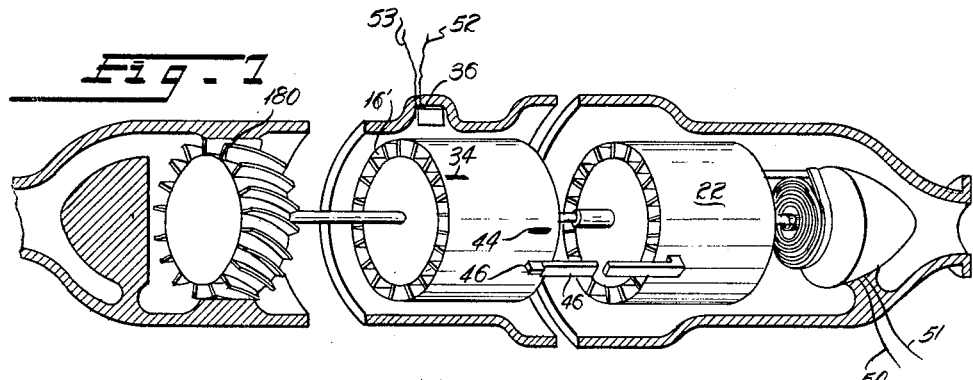
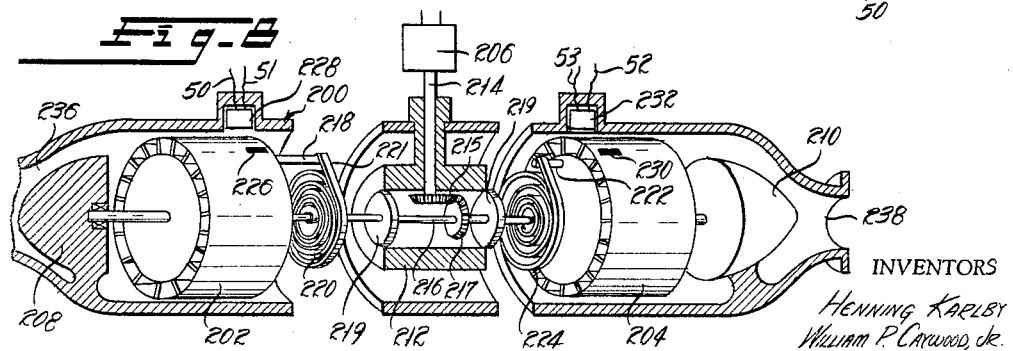

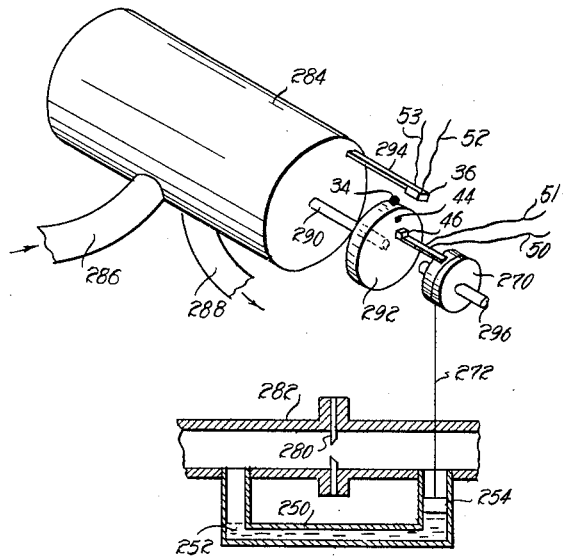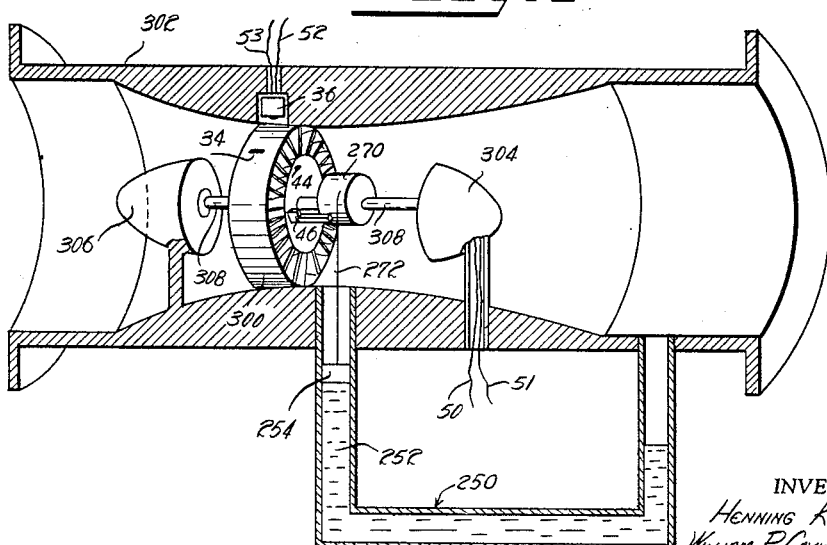

United States Patent Office 3,164,017
Patented Jan. 5, 1965

3,164,017
FLOW MEASURING APPARATUS
Henning Karlby, Pittsburgh, William P. Caywood, Jr., Murrysville, and Henry Earnest Lehman, Pittsburgh, Pa., assignors to Rockwell Manufacturing Company, Pittsburgh, Pa., a corporation of Pennsylvania
Filed Nov. 7, 1957, Ser. No. 694,968
4 Claims. (Cl. 73—194)

The present invention relates to fluid flow measurement and more specifically to a novel method and apparatus for producing an indication of mass flow, i.e. both mass rate and total mass passed.

Venturi and orifice meters have for many years been used for industrial measurement of fluids. Various compensating devices were incorporated to correct for temperature and density changes where the measuring application called for high accuracy of the actual mass metered. Recent activity in the fluid flow metering field has been directed toward meters which measure mass rate directly and hence provide measurements which are independent of temperature and density changes. Mass rate meters, such for example of the type shown in Patent No. 2,714,310 to Jennings, are peculiarly well adapted for measuring fluids such as fuels which change between liquid and gaseous states during the metering periods.

Many metering applications, as for example in the petroleum field, require an indication of the total mass flow as distinguished from mass rate. While conventional integrating apparatus may readily be connected to a mass rate meter to produce total flow indications, cumulative errors from the mass rate indication and from the integrating apparatus have limited the degree of acceptance of such meters. Integrating apparatus of sufficient accuracy to provide an over-all metering system as accurate as the prior meters is so expensive that adoption of the new type direct reading mass rate meter has been retarded in or even precluded from many potential markets.

A major object of the present invention is to provide a novel apparatus for producing an integrated total of the mass flow through known meter structures which intrinsically measure only mass rate or flow rate. This novel apparatus is generally applicable to meters having an element which functions as a flow obstruction to furnish a manifestation of the product of mass rate and velocity where the velocity is either the natural pipe velocity or a velocity artificially produced at right angles to the flow direction, and the indication is scanned at whichever of the velocities is used to produce a signal varying in time duration in proportion to the mass rate through the meter. In some embodiments, the scanning velocity is constant while in other embodiments the scanning velocity may vary and a counter is provided to accept the time signals at a uniform rate per unit time to produce an indication of total mass flow.

Another object of the invention is to provide a novel apparatus of measuring the mass rate of fluid flow as a function of time which may be readily totalized to provide an indication of total mass flow. In certain modifications of this general apparatus, the conventional meter structure does not have to be driven at a constant speed and therefore a smaller motor or a motor of the type having variable speeds may be used.

A further major object of this invention is to provide in a flow meter a novel scanning apparatus for producing a signal varying in time duration in proportion to an angle of displacement. With a constant speed scanner, an electronic counter is provided to totalize the signals as a measure of total fluid flow. Where the scanning speed varies with varying flow rates, the counting circuit is adapted to sample only a uniform number of signals per unit time to produce the measure of total fluid flow.

Still another object of this invention is to provide a novel fluid metering system wherein the flow meter produces an angle of displacement proportional to the product of the mass rate and the velocity change at right angles to the flow direction, and the angle of deflection is scanned at a velocity proportional to said velocity change to produce a signal varying in time width in proportion to mass rate. If the scanning velocity is constant, then the counting system is provided to totalize the signals as a measure of total fluid flow, but where the scanning speed varies with varying flow rates, the counting circuit is adapted to sample only a uniform number of signals per unit time to produce the measure of total mass flow.

Further objects of the invention are to provide an electronic circuit adapted to control operation of the counter; a gating circuit adapted to produce pulse packets consisting of a series of high frequency pulses, the number of which is proportional to flow rate; and a circuit arrangement assuring only complete pulse packets are counted where pulse packets supplied to the counter are sampled.

These and other objects of the invention will become more fully apparent from a description of the several illustrative embodiments and from the claims and from the description and the accompanying drawings wherein:

FIGURE 1 is a diagrammatic view of a known type fluid flow meter adapted to produce a mass rate indication, but modified in accordance with the present invention to produce a signal varying in width, proportional to the mass rate;

FIGURE 2 is a pictorial view of a permanent magnet element used in the meter embodiment of FIGURE 1;

FIGURE 3 is a diagrammatic view showing the magnet and electromagnetic pickup element as used in the meter of FIGURE 1;

FIGURE 4 is a block diagram of an electronic circuit adapted to be connected to the meter structure of FIGURE 1;

FIGURE 5 is a typical circuit diagram as represented by the block diagram of FIGURE 4;

FIGURE 6 is a block diagram of a modified form of electronic counting circuit for use with the meter structure of FIGURE 1 when motor 23 thereof is other than of the constant speed type;

FIGURE 7 is a diagrammatic view of a flow meter similar to the mass rate meter of FIGURE 1 driven by a turbine instead of an electric motor;

FIGURE 8 is a further embodiment of a mass meter adapted to provide an angle of deflection proportional to the product of the mass rate and velocity change in a direction at right angles to the fluid flow through the meter, and having means for producing a signal varying in time duration in proportion to the mass rate;

FIGURE 9 is a diagrammatic view of a venturi meter having a float controlled drum for producing an angle of deflection proportional to the product of the mass rate and flow velocity which angle is adapted to be scanned by magnets carried by a turbine; and FIGURE 10 is a diagrammatic view of an orifice meter having a positive displacement meter for controlling the scanning operation.

Referring now to FIGURE 1, a mass rate meter is illustrated to show one typical arrangement for determining total mass flow. This meter is substantially identical to that shown in U.S. Patent No. 2,714,310 to Jennings except for the means for indicating the total mass flow through the meter which is attained in accordance with the present invention. The meter of FIGURE 1 inherently produces an indication proportional to mass rate; for example, if a constant flow velocity or volume is assumed and only the density of the fluid is varied, the meter will register the change in mass rate whereas volumeters such as positive displacement types do not respond to changes in density. The mass rate meter of FIGURE 1 will also, of course, register changes in flow velocity through the pipe.

This meter arrangement comprises a generally cylindrical outer structure or housing 10 through which the metered fluid flows in a substantially axial direction from an upstream inlet opening 12 to a downstream outlet opening 14. Within housing 10 is an impeller 16 having suitable blades 18 with equally spaced longitudinal slots between blades 18 so that the fluid passing through the meter is directed into the spaces between blades 18. An outer cylindrical sleeve 20 is secured to the outer ends of blades 18 and has a close running clearance with the interior wall of housing 10.

Restrained turbine 22 is substantially identical to impeller 16 in construction and both are journalled for rotational movement on shafts 24 and 26 respectively which may be supported in suitable fixed brackets 28 and 30 which are rigid with housing 10.

In this type of metering apparatus, it is necessary that impeller 16 be of such axial length and, in the prior meters, driven at a constant anuglar velocity so that the fluid mass to be measured is given a constant angular velocity in a direction perpendicular to the flow through the meter. Motor 23 which may be synchronous or non-synchronous in this embodiment has means for holding the speed constant, and is connected to drive impeller 16 through a suitable gearing arrangement which may include bevel gears 29 and 31.

Restrained turbine 22 is held against rotation as by spiral spring 32, one end of which is secured to pin 33 on bracket 28 and the other end to shaft 24 turning with restrained turbine 22 whereby restrained turbine 22 is free to rotate through an angle of displacement ($\phi$) which is proportional to the mass rate of fluid flow through the meter. With zero mass flowing through the meter and impeller 16 rotating at a fixed angular velocity, restrained turbine 22 assumes a reference or zero flow position. With an increase of mass rate ($\dot{m}$) of fluid flow through the meter, there is a corresponding linear increase of the angle of displacement ($\phi$) of restrained turbine 22, the magnitude of which is fundamentally proportional to the flow rate of the mass, also referred to as mass rate, through the meter as is clearly explained in Jennings Patent No. 2,714,310.

In many metering applications, the total mass flow rather than mass rate is desired. While the time integral of the angular displacement of restrained turbine 22 can obviously be attained, the cost of integrating equipment having sufficient accuracy causes this metering system to be priced out of many potential markets. In accordance with our invention, the need for conventional analog type integrating equipment is obviated and only a simple and relatively inexpensive digital type electronic timing circuit and a commercially available electronic counter is required.

The underlying method is based on the relationship that the force (F) causing the deflection angle ($\phi$) of restrained turbine 22 is equal to the product of the change in mass per unit time ($\dot{m}$) and the velocity ($v$) of the mass in the relevant direction. In the meter of FIGURE 1, the impeller 16 gives each particle or element of fluid mass ($m$) effectively a constant velocity ($v$) in a direction perpendicular to the axis of the meter (and hence independent of the axial flow rate through the meter) and the force (F) to change this velocity ($v$) by a known amount, i.e. to zero, is directly proportional to the mass rate ($\dot{m}$). Hence the deflection angle ($\phi$) of restrained turbine 22 and spring 32 which is due to the force (F) is directly proportional to mass rate ($\dot{m}$).

In accordance with the invention, the force (F) is converted into a parameter of time so that instead of using the deflection angle ($\phi$) as the basic indication, a time measurement is produced and with a totalizing apparatus which is, in essence, digital in nature, the total mass flow is obtained without the use of an analog type integrating apparatus.

Mathematically the displacement angle ($\phi$) is proportional to the product of the angular velocity ($\omega$) of impeller 16 and mass rate ($\dot{m}$). Rewriting this expression in terms of mass rate, we have $$\dot{m} = K\frac{\phi}{\omega} \tag{1}$$

where K represents a suitable constant.

With reference to the metering arrangement of FIGURE 1, if an element such as 16 is moving at any constant angular velocity ($\omega$), then the time ($t$) it takes a point on that element to traverse the displacement angle ($\phi$) of the restrained turbine 22 will be $$t = \phi/\omega \text{ or } \phi = \omega t \tag{2}$$

Substituting this expression of $\phi$ in the previous Equation 1 for $\dot{m}$, we have $$\dot{m} = K\frac{\phi}{\omega} = K\frac{\omega t}{\omega} = Kt \tag{3}$$

Therefore, the mass rate is seen to be directly proportional to the time ($t$) as defined above. Totalizing the time intervals over an extended period will produce an accurate indication of the total mass flow.

To utilize this method of total mass indication, the prior type of mass rate meter is modified to produce an appropriate output signal corresponding to the time interval ($t$) required for a point moving at a uniform velocity to sweep the displacement angle ($\phi$) of the restrained turbine 22. In the meter described in FIGURE 1, a small magnet 34 is embedded in the outer surface of sleeve 20 of impeller 16 and an electromagnetic pickup 36 is mounted in a fixed position in meter housing 10 to serve as a position sensing element.

A suitable magnet made of a material, known as Alnico V, is shown in FIGURE 2, and an electromagnetic pickup of the type used in magnetic tape recorders and illustrated diagrammatically in FIGURE 3 has been found to operate satisfactorily. Magnet 34, which is approximately ⅛ x ⅛ x ¹⁄₆₄ inches, is embedded in the surface of sleeve 20 with only its point 38 protruding. As magnet 34 sweeps past nonmagnetic gap 40 of electromagnetic pickup 36, an electrical impulse is generated on leads 52 and 53 which is used as the beginning of a signal varying in time duration in direct proportion to the mass rate.

A second similar magnet 44 is positioned on sleeve 20 adjacent restrained turbine 22. A second similar electromagnetic pickup 46 is supported in position over the path of magnet 44 as by arm 48 which is suitably secured to restrained turbine 22. Electrical leads 50 and 51 from electromagnetic pickup 46 are led to the exterior of the housing through bracket 28, and the diameter of housing 10 may be enlarged at 49 to permit rotation of arm 48 and pickup 46 as restrained turbine 22 rotates through its angle of deflection ($\phi$). Arm 48 is shown in a position corresponding to a deflection angle ($\phi$) from a reference position corresponding to zero mass rate. As magnet 44 sweeps past pickup 46 an electrical impulse is generated on leads 50 and 51 which is used as the end of the signal, and the time interval between the occurrence of an electrical impulse on leads 52 and 53 of electromagnetic pickup 36 and the impulse on leads 50 and 51 from the electromagnetic pickup 46 is proportional to the angle of deflection ($\phi$) or mass rate ($\dot{m}$).

The magnets 34 and 44 and electromagnetic pickups 36 and 46 are illustrated as a typical type of transducer that has been found to be satisfactory. Changes in position of a few thousandths of an inch of restrained turbine 22, are readily detected by the magnets and electromagnetic pickups. Photoelectric or other transducers could also be used if desired.

Referring now to FIGURE 4, a typical electronic circuit is illustrated wherein leads 52 and 53 from electromagnetic pickup 36 are connected to amplifier 60 and leads 50 and 51 from electromagnetic pickup 46 are connected to amplifier 62. Amplifiers 60 and 62 are connected through squaring circuits 64 and 66 to flip-flop 68, the output of which controls opening and closing of gate 70. Oscillator 72, which is preferably crystal controlled and which operates at a frequency several orders of magnitude higher than the switching frequency of flip-flop 68, is connected to gate 70. The individual pulses from oscillator 72 passed by gate 70 are totalized in counter 74. Since gate 70 is opened by the impulse to amplifier 60 and closed by the impulse to amplifier 62, the number of pulses from oscillator 72 passed by the gate for each revolution of impeller 16 is proportional to the mass rate, and totalizing these pulses over an extended period of time produces an indication of total mass flow.

In operation, the fluid passing through meter housing 10 is given a fixed angular velocity by upstream impeller 16 in a direction at right angles to the flow path through the meter and the angle of displacement ($\phi$) of the reaction turbine 22 is proportional to the mass flow rate ($\dot{m}$). Instead of measuring the displacement angle ($\phi$) as has been done in prior meters of this type, the time interval required for sweeping the displacement angle ($\phi$) is measured and this time interval is translated into an electrical pulse packet comprising a series of high frequency pulses, the number of which depends upon the scanning interval ($t$), and the high frequency pulses in the constantly recurring pulse packets are totalized in a conventional pulse counter 74 as a measure of total mass flow.

Referring now to FIGURE 5, an exemplary electronic circuit is shown in detail corresponding to the block diagram of FIGURE 4. Linear amplifiers 60 and 62 are shown connected to electromagnetic pickups 36 and 46 respectively, which provide small negative going pulses. Negative pulses having an amplitude of approximately 18 volts are present at the amplifier outputs on leads 76 and 78 and are applied to conventional squaring circuits 64 and 66. The output signals on leads 80 and 82 are also negative going pulses having an amplitude of approximately 80 volts and are applied to the input terminals of a conventional flip-flop circuit 68. The plate voltages, which vary between about 60 volts when tube 109 or 110 is conducting and 120 volts when the tube is cut off, are applied by leads 84 and 86 across a diode bridge 87, which may be composed of four matched 1N92 crystal rectifiers 88. When lead 86 is negative relative to lead 84, current flows from lead 84 through rectifiers 88 which are all polarized in the same direction to lead 86. The voltage drop across the bridge is extremely low, and resistors 90 and 92 serve as current limiting resistors. Terminals 94 and 96 are connected to the primary side 98 of a transformer 100 having a secondary winding 102 with a turns ratio of 9:1 whereby the low impedance in the primary circuit reflected into the secondary circuit, which is connected across the grid circuit of amplifier tube 104 by leads 106 and 108, shorts out any input signal to amplifier tube 104. Oscillator 72, the frequency of which is accurately controlled by crystal oscillator 107, serves as a source of high frequency pulses which are gated by amplifier tube 104 through to counter 74.

After the negative going pulse on lead 80 from squaring circuit 64 is applied to the grid of tube 109 to stop conduction through that tube and trigger tube 110 to an "on" condition, the voltage level on lead 86 is positive with respect to the voltage level on lead 84; rectifier bridge 87 then offers a high impedance which is reflected through transformer 100 to be across the grid circuit of tube 104. The output signal from the 100 kc. oscillator 72 is then permitted to pass to the grid of tube 104 rather than being shorted out, and a packet of 100 kc. pulses is supplied via lead 118 to a conventional counter 74, available commercially as Berkeley electronic counter Model 410. The number of pulses in each packet is determined by the length of time tube 109 in flip-flop 68 is cut off and tube 110 is conducting. When the negative pulse on lead 82 is applied to tube 110 and flip-flop 68 reverts to its normal conduction condition, the current conduction through bridge 87 is effective to short circuit the input to amplifier tube 104 and prevent pulses from oscillator 72 from being counted in counter 74.

There is thus provided a metering system whereby the meter structure which intrinsically measures mass flow rate is modified to produce two sequential electrical impulses with the time interval between said impulses being proportional to the mass rate; this time interval is then converted into a digital type signal composed of a series of pulses, the number of which is controlled by the length of said time interval. Finally, the series of pulses are totalized over an extended period of time to provide a total mass flow indication.

With this method of producing an indication of the total mass flow, it has been found that certain essential characteristics of the prior metering apparatus are no longer necessary and may be dispsensed with without greatly affecting the accuracy of the total mass flow. One very important change is that impeller 16 need not be driven at a constant velocity. This offers the advantage that motor 23 of FIGURE 1 does not need to be a synchronous motor as in the prior meter structure, and makes possible the use of a smaller or less expensive type motor. For example, in installations where the power supply frequency varies or where d-c power is used such as in aircraft, a variation in speed by motor 23, either by slowing down or speeding up within the linear limits of the other meter components, does not destroy the accuracy of the meter. The uniform or constant angular velocity of impeller 16 is unnecessary because a decrease or increase in motor speed is reflected in both the deflection angle ($\phi$) of the downstream impeller 22 and the angular velocity of the scanning magnets 34 and 44 so that the scanning interval ($t$) remains directly proportional to mass rate ($\dot{m}$).

This is true because by the intrinsic nature of the meter of FIGURE 1, the mass rate ($\dot{m}$) = $K' \cdot \phi$ where $K'$ is a constant, and in the above description and from Equation 1, it has been pointed out that the constant $K'$ includes the term ($\omega$) corresponding to the angular velocity of the mass which directly controls the magnitude of the deflection angle ($\phi$). Recognizing that $$\dot{m} = K \frac{\phi}{\omega}$$

and $$\omega = \frac{\phi}{t}$$

the mass rate ($\dot{m}$) can then be measured by simply measuring the time interval ($t$) with the meter structure of FIGURE 1 even though the deflection angle ($\phi$) has assumed a different linear relationship with mass rate, and the true mass rate indication available as a time interval is therefore, in the steady state, independent of variations in ($\omega$) of the upstream impeller 16 because such variations are directly cancelled out by corresponding variations in ($\phi$). It will be appreciated that during the steady state condition, the impeller 16 will be turning at some constant angular velocity. If the flow conditions in the pipeline—such as fluid density or volumetric rate of flow—change, the non-synchronous motor will adjust itself to some new steady state angular velocity to adjust for these changed flow conditions. The new angular velocity will become constant and remain constant for so long as the new flow conditions persist. Thus, the time interval ($t$) required to scan the angle will be proportional to the mass rate $\dot{m}$ no matter what particular value the angular velocity of the impeller may assume as is indicated by Equation 3. While the impeller 16 is accelerating or decelerating to some new steady state condition upon the change of flow conditions in the pipeline, the time interval $t$ will be nearly proportional to mass rate $\dot{m}$. Some very small inaccuracies in total mass flow may be introduced during these transient state periods. However, in most metering applications, the flow conditions are relatively stable so that a steady state persists for all but a small fraction of the metering time. It has been determined that these short periods of transient state do not greatly affect total meter accuracy. Because of these facts, it is therefore unnecessary that the speed of motor 28 remain constant to produce an effective mass meter.

There remains, however, the task of totalizing the scanning time periods ($t$) which, because the motor speed and hence the number of scanning cycles per second is not held constant, can no longer simply be added once for each revolution of the upstream impeller 16. This problem is, in accordance with the invention, solved by periodically sampling the mass rate indication and totalizing only the sampled measurements. This is possible because the scanning periods ($t$) still represent mass rate and by utilizing only a constant number of scanning periods per unit time in the totalizing system, the counter may be calibrated to provide an indication of total mass flow.

Since in the embodiment of FIGURE 1, an impeller speed of 100 to 600 r.p.m. is generally satisfactory, a speed of 180 r.p.m. or 3 revolutions per second may be selected in the specific example to be described. Then the totalizer is gated to periodically receive counts indicative of the time interval, as for example only once each second. From the metering standpoint, this means sampling the mass rate once each second to produce an indication of the average flow rate which is used as the basis for the totalized indication. Other sampling rates could be used if desired, and this example is merely given by way of illustration.

The totalizing system for meter of FIGURE 1 having motor 23 running at variable speeds is shown in FIGURE 6. The leads 52 and 53 from pickup 36 and leads 50 and 51 from pickup 46 are connected to their respective signal channels, each comprising an amplifier stage 101, 103 and squaring circuit stages 105, 107, and to flip-flop 113. Oscillator 111 and flip-flop 113 are connected to a first gate 112 and its output connected to amplifier 114. Up to this point the circuit is identical to the block diagram of FIGURE 4 and may be constructed by the circuit components of FIGURE 5.

On lead 116 will appear pulse packets 118–124 each of a width ($t$) corresponding to the time for the magnets 34 and 44 to scan the deflection angle ($\phi$). Each packet actually contains a series of relatively high frequency pulses, such for example as 100 kc., the exact number of pulses in each packet being determined by the time interval gate 112 is held open by flip-flop 113.

When a second gate 126 is open, the first pulse packet 118 goes through to counter 128 and the number of high frequency pulses from oscillator 111 in that pulse packet are entered in totalizing counter 128. Since it is desired to sample the mass rate only once a second and the totalizing counter has been so calibrated, it is necessary to close gate 126 after the first pulse packet 118 has been passed until the next second starts.

Pulse stretcher 130 is connected to receive the pulse packets passed by gate 126 on lead 132 to counter 128, and after the first pulse packet 118 has been received by counter 128, a signal is supplied to amplifier 134 from pulse stretcher 130 which energizes pulse former circuit 136. Pulse stretcher 130 may comprise a conventional RC charging circuit along with a diode arrangement as illustrated which prevents the capacitor 133 from discharging during the short intervals between adjacent pulses in a single pulse packet, but after the end of pulse packet 118, the input signal to amplifier 134 causes pulse former trigger 136 to produce a reset pulse on lead 138. Pulse former circuit 136 may be a conventional trigger type circuit and its reset pulse output signal is applied through leads 138 and 140 to flip-flop 142, which in turn closes gate 126 so that the next pulse packets 119 and 120 are discarded and not transmitted to counter 128.

An intervalometer 144, which is any suitable device for periodically producing an electrical pulse at a low frequency, is provided to produce a signal once each second to trigger flip-flop 142 and open gate 126 so that the next pulse packet, as for example packet 121, may be passed to counter 128. After packet 121 is received by counter 128, the circuit including pulse stretcher 130, amplifier 134 and pulse former 136 again comes into operation and triggers flip-flop 142 to close gate 126. Gate 126 remains closed until again opened by an output pulse from intervalometer 144, and thus a uniform number of pulse packets are sampled each second.

One problem has arisen because the electric motor speed and the gating signals from intervalometer 144 may be very nearly multiples, and in such cases gate 126 occasionally opens at a time after part of a pulse packet has already been discarded and therefore counter 128 would receive less than the entire packet of high frequency pulses. To prevent this partial counting, anti-coincidence circuit 146 is provided so that a timing pulse from intervalometer 144 cannot trigger flip-flop 142 on to open gate 126 at the time when gate 112 is held open by flip-flop 113.

The circuit to prevent this partial counting may include flip-flop 148 which is triggered on by intervalometer 144 and off by the output of pulse former 136 after a pulse packet has been received. The output of flip-flop 148 normally passes through anti-coincidence circuit 146 to trigger flip-flop 142 and open gate 126. But, in the event gate 112 is open and a pulse packet is already in progress, a signal on lead 150 to amplifier 152 is applied to block transmission of the signal through anti-coincidence circuit 146 from flip-flop 148 to flip-flop 142. As soon as flip-flop 113 returns to its "off" condition and gate 112 closes, then the signal from amplifier 152 is terminated and anti-coincidence circuit is opened. Where the signal from the intervalometer 144, which may be only a short pulse, has occurred during the time amplifier 152 had anti-coincidence circuit 146 cut off, flip-flop 148 will have triggered to serve in a sense as a memory, and as soon as anti-coincidence circuit 146 opens, flip-flop 142 will be triggered to open gate 126 so that the next pulse packet, which may be pulse packet 119 is received where the output signal from intervalometer 144 occurs after pulse packet 118 has started. This circuit, therefore, assures that only one full pulse packet is counted by the totalizing counter 128 each second.

With a totalizing system of the type as described in FIGURE 6, the metering apparatus may be modified as shown in FIGURE 7 by the substitution of a fixed guide vane assembly 180 and a radial-bladed turbine 16' in place of electric motor 23 and impeller 16 of FIGURE 1. In the embodiment of FIGURE 7, the fluid, when passing through the fixed guide vane assembly 180 with proper blading, will obtain an angular velocity directly proportional to the volumetric flow rate. The turbine 16' with radial-blading is driven by the fluid and its angular velocity is directly proportional to the flow rate of the fluid. When the fluid hits the spring restrained turbine 22, the entire angular velocity of the fluid is destroyed resulting in a deflection angle ($\phi$) of the turbine 22 as in the case of the meter of FIGURE 1. This metering system does not require an electric drive motor and is particularly useful in measuring systems where low flow rates are not encountered.

Magnets 34 and 44 and the associated electromagnetic pickups are all the same as shown in the embodiment of FIGURE 1. Leads 50 to 53 are connected into the electronic totalizing system as shown in FIGURE 6 to provide a complete mass measuring system utilizing the chronometric or scanning time measuring method of the present invention.

Other metering arrangements may also be used with the chronometric measuring method of the present invention. In FIGURE 8, a further form of a mass meter is illustrated which comprises a housing 200 generally similar to the housing 10 of FIGURE 1 having two impellers 202 and 204, but in this form of mass meter each impeller is driven at identical angular velocities ($\omega$) by motor 206. Both of the impellers 202 and 204 may be identical to the impellers shown in the embodiment of FIGURE 1 and are suitably journalled for rotation in end supports 208 and 210. A center support 212 is provided which carries motor shaft 214 and bevel gear 215. Shaft 216 driven by bevel gear 217 is mounted for rotation in bearings 219, also fixed in support 212. Upstream impeller 202 is provided with rigidly connected drive arm 218 which is secured to one end 221 of a torsion spiral spring 220, the inner end of which is connected to rotating shaft 216. Downstream impeller 204 contains a similar arm 222 and torsion spiral spring 224 connected to rotating shaft 216. Motor 206 accordingly drives both the impellers 202 and 204 at the same angular velocity through their respective torsion springs.

In a meter of this type, which is more fully described in the co-pending application of Henning Karlby, serial No. 427,558 filed May 4, 1954 now patent No. 2,940,309, the upstream impeller 202 imparts to the incoming fluid mass to be measured, which is assumed to be purely axial, having no tangential flow component, an angular velocity at right angles to and independent of the flow rate through the meter, and by measuring the energy, or in this embodiment the force, required to impart this known velocity, an indication of total mass flow may be obtained. The purpose of downstream impeller 204 is to provide an impeller having the same losses such as friction and fluid clutching, to which the upstream impeller 202 is subjected, and then the energy, or force, required to run the downstream impeller is subtracted from the energy, or force, supplied to upstream impeller to thereby produce a net energy, or force, that is directly proportional to the mass flow rate.

In FIGURE 8, instead of measuring the energy required to drive each impeller as in the apparatus described in said application Serial No. 427,558 and then subtracting the driving energy of the second impeller from the driving energy of the first impeller, I utilize the difference in deflection between torsion springs 220 and 224. The deflection of torsion spring 220 is due to the force required to accelerate the mass to the predetermined angular velocity, but is larger than the actual mass flow rate by an amount equal to the force necessary to overcome the friction of the impeller and certain other losses. The deflection of torsion spring 224 on downstream impeller is due only to the friction and said other losses since it does not change the angular velocity of the mass flowing. Therefore the appropriate displacement angle ($\phi$) to scan is the difference between the absolute displacement angle ($\phi_1$) of impeller 202 and the absolute displacement angle ($\phi_2$) of impeller 204.

Scanning of the displacement angle may be accomplished by use of magnet 226 embedded in impeller 202 and electromagnetic pickup 228 and magnet 230 embedded in impeller 204 and electromagnetic pickup 232. The positions of electromagnetic pickups 228 and 232 are adjusted so that with the meter and inlet pipe 236 and outlet pipe 233 filled with the fluid to be measured which is held at zero flow rate, output signals from the pickups are in phase. As soon as the fluid flow starts, magnet 226 will assume a position lagging in phase behind the position of magnet 230, and by connecting electromagnetic pickup 232 to leads 52 and 53 which control the beginning of the scanning interval and connecting electromagnetic pickup 228 by leads 50 and 51 which control the end of the scanning period in the circuit of FIGURES 4 or 5, gate 70 will be opened for a time interval equal to the difference between the angles of displacement of torsion springs 220 and 224. Assuming motor 206 to be a constant speed motor, then the scanning periods may be totalized by the circuit of FIGURE 4.

As with the embodiment of FIGURE 1, the speed of motor 206 in FIGURE 8 need not be constant because any decrease in angular velocity of impellers 202 and 204 will cause a corresponding decrease in the difference between the displacement angles, and therefore the time interval required to scan the difference between the displacement angles is independent of changes in motor speed. In meter installations where the constant speed motor is not used, the circuit of FIGURE 6 is to be used for providing the time integration to produce the indication of total mass flow.

The metering principles of the present invention can be adapted into other types of conventional meters as are diagrammatically indicated in FIGURES 9 and 10. FIGURE 9 illustrates the conversion into a mass meter from a combination of a turbine meter and a venturi meter by means of the metering method of the present invention. A turbine 300 driven by the flowing fluid is journalled for rotation in supports 304 and 306 on shaft 308, the speed of which is directly proportional to the flow velocity ($v$) of the fluid. A conventional U-tube manometer 250 partially filled with a suitable liquid 252 and containing a float 254, the displacement of which is responsive to the pressure differential of the venturi.

Turbine 300 may be similar in construction to impeller 16 of FIGURE 1 but with slanted blades and have a first magnet 34 embedded in its periphery and a second magnet 44 in a side surface adjacent drum 270. Drum 270 is mounted to turn freely on shaft 308 and carries an electromagnetic pickup element 46 having leads 50 and 51 extending exteriorly of meter pipe 260. A prestressed flat metal tape or wire 272 is connected between float 254 and the periphery of drum 270 so that the angular position of the drum, and hence electromagnetic pickup 46, is controlled by the displacement of float 254. Electromagnetic pickup 36 having leads 52 and 53 is mounted in a fixed position on pipe 302 to be in an operative position with magnet 34.

Turbine 300 senses only flow rate $v$ whereas the differential pressure of the manometer is an indication proportional to $\rho v^2$ or $\dot{m}v$ where $\rho$ is the mass density of the fluid and $\dot{m}$ the mass rate. The angular deflection $\phi$ of drum 270 is determined directly by the differential pressure of the manometer through float 254 or $\phi = k\dot{m}v$ where $k$ is a meter constant. As turbine 300 rotates at a velocity proportional to $v$ only, the displacement angle $\phi$ through which drum 270 rotates is proportional to $k\dot{m}v$. The angle of displacement $\phi$ is converted into a signal varying in time duration by means of magnets 34 and 44 which produce a signal from electromagnetic pickup 36 on leads 52 and 53 serving as the beginning of the time interval and a signal from electromagentic pickup 46 on leads 50 and 51 serving as the end of the time interval. This time interval of the signal is directly proportional to $$\frac{\phi}{v} = \frac{k\dot{m}v}{v} = k\dot{m}$$

or the mass rate $\dot{m}$. Leads 50, 51, 52 and 53 are connected into the electronic totalizing of FIGURE 6 to produce an integrated total of mass flow.

Referring now to FIGURE 10, the conventional orifice meter having an orifice plate 280 in pipe 282 is shown to further illustrate the general applicability of the present invention. In this embodiment, a positive displacement meter 284 is provided having an inlet 286 and an outlet 288 connected in series with pipe 282. Meter 284 drives shaft 290 at a speed proportional to the flow velocity $v$ to serve as a substitute for turbine 300 of FIGURE 9. A suitable disc 292 is secured to turn with shaft 290 and carries magnets 34 and 44. Electromagnetic pickup 36 is supported by a stationary arm 294 from the housing of meter 284 and leads 52 and 53 are adapted for connection into the circuit of FIGURE 6.

Drum 270 is mounted to turn freely about the axis of shaft 296 and carries electromagnetic pickup 46 which is mounted adjacent the path of magnet 44. The prestressed tape or wire 272 is suitably connected to float 254, as diagrammatically indicated in FIGURE 10, so that the angular displacement of drum 270, and hence electromagnetic pickup 46, is determined by the position of float 254.

The operation of the metering system of FIGURE 10 is identical to that of FIGURE 9 since the positive displacement meter 284 of FIGURE 10 is the counterpart of turbine meter 300 of FIGURE 9, each sensing only the flow rate $v$ whereas the differential pressure of the manometer produces an indication proportional to $\rho v^2$ or $\dot{m}v$. Since the effective scanning velocity is proportional to the flow velocity $v$, the time duration to scan the displacement angle $(\phi)$ of drum 270 is proportional to $\rho v$, which as pointed out above, is the same as mass rate $(\dot{m})$. Hence the time difference between the electrical impulses occurring on leads 50 and 51 and on leads 52 and 53 is proportional to mass rate $(\dot{m})$. Applying the electrical impulses from leads 50, 51, 52 and 53 to the chronometric measuring system of FIGURE 6 results in an indication of total mass flow from totalizing counter 128.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a mass rate meter having an impeller mounted for rotation to impart a change in velocity of the fluid mass in a direction and of such magnitude so as to be substantially independent of the flow rate of the mass through the meter, means for driving said impeller, a reaction member mounted for rotational movement in the fluid flow path, restraining means connected to said reaction member for causing said reaction member to deflect through an angle proportional to the product of the mass rate of fluid flow and said imparted change in velocity, transducer means including magnetic means mounted for rotation with said impeller, fixed magnetic pick-up means, and movable magnetic pick-up means mounted on said reaction member, each responsive to said magnetic means, for sensing said angle of displacement, means connected to said transducer means for producing a signal having a time duration proportional to said angle, and operative means responsive to said signal to indicate the flow rate.

2. A mass rate meter as defined in claim 1 wherein said magnetic means includes two magnets and said fixed magnetic pick-up means is a head which is responsive to one of said magnets and said movable magnetic pick-up means is a head which is responsive to the other of said magnets.

3. In a fluid flow meter having walls defining a fluid flow passage, an impeller mounted for rotation in said passage; a permanent magnet mounted to turn with said impeller; a first electromagnetic pickup element mounted in a fixed position to be operatively associated with said magnet and produce a first electrical impulse during a revolution of rotation of said impeller; means including a second electromagnetic pickup element mounted for producing a second electrical impulse during a revolution of rotation of said impeller; electrical circuit means for producing an electrical pulse having a leading edge controlled by one of said pulses and a trailing edge controlled by the other of said pulses to produce a signal in the form of a pulse having a width proportional to the flow rate through the meter; a first gate means; means applying said signal pulses to open said first gate means; a source of constant frequency signals occurring at a rate of at least two orders of magnitude higher than the average recurrence rate of said signal pulses; counting apparatus responsive to said constant high frequency signals; an intervalometer producing an output signal at a uniform rate lower than the recurrence rate of said signal pulses; a further gate means; an anti-coincidence circuit connected between said intervalometer and said further gate means; means for producing a reset signal at the termination of a pulse including a pulse stretcher circuit; circuit means for directing constant frequency pulses through said first gate means to said further gate means and to said pulse stretcher circuit; means for directing said intervalometer signals to open said further gate means; means for directing said reset signal to close said further gate means; and circuit means for directing a signal from said means applying said signal pulses to open said first gate means to said anti-coincidence circuit to prevent said further gate means from opening while said first gate means is open.

4. In a mass rate meter having an upstream impeller mounted for rotation to impart a change in velocity of the fluid mass in a direction and of such magnitude so as to be substantially independent of the flow rate of the mass through the meter, means for driving the impeller, a reaction member mounted for rotational movement in the fluid flow path, and restraining means connected to said reaction member for causing said reaction member to deflect through an angle proportional to the product of the mass rate of fluid flow and said imparted change in velocity, the improvement for registering this mass flow comprising: a pair of transducer elements each energized at a rate synchronous with the angular velocity of said impeller but at intervals separated by a time proportional to the deflection angle of said reaction member; a gate means; a source of constant frequency signals occurring at a rate of at least about two orders of magnitude higher than the rate of energization of said transducer elements; counting apparatus responsive to said constant frequency signals; means connecting said source of constant frequency signals through said gate means to said counting apparatus; and means applying output signals from said transducer elements for respectively opening and closing said gate at regular periodic intervals with the time said gate is open at each interval being proportional to the instantaneous flow rate.

References Cited in the file of this patent

UNITED STATES PATENTS

| | | |
|---|---|---|
| 2,061,441 | Smith | Nov. 17, 1936 |
| 2,088,568 | Beecher | Aug. 3, 1937 |
| 2,534,712 | Gray | Dec. 19, 1950 |
| 2,683,224 | Cole | July 6, 1954 |
| 2,714,310 | Jennings | Aug. 2, 1955 |
| 2,724,269 | Kalmus | Nov. 22, 1955 |
| 2,767,582 | Bartelink | Oct. 23, 1956 |
| 2,831,348 | Kritz | Apr. 22, 1958 |
| 2,911,825 | Kritz | Nov. 10, 1959 |
| 2,943,487 | Potter | July 5, 1960 |
| 2,974,525 | Cole | Mar. 14, 1961 |

FOREIGN PATENTS

| | | |
|---|---|---|
| 740,037 | Great Britain | Nov. 9, 1955 |